United States Patent [19]

Komuro et al.

[11] Patent Number: 4,956,654
[45] Date of Patent: Sep. 11, 1990

[54] LIQUID INJECTION RECORDING HEAD WITH FLEXIBLE SUPPORT

[75] Inventors: Hirokazu Komuro, Hiratsuka; Hiroto Matsuda, Ebina; Hiroto Takahashi; Makoto Shibata, both of Hiratsuka; Masami Ikeda, Machida; Hisanori Tsuda, Atsugi, all of Japan

[73] Assignee: Canon Kabushiki Kaisha, Tokyo, Japan

[21] Appl. No.: 262,120

[22] Filed: Oct. 25, 1988

Related U.S. Application Data

[63] Continuation of Ser. No. 41,629, Apr. 22, 1987, abandoned, which is a continuation of Ser. No. 694,063, Jan. 23, 1985, abandoned.

[30] Foreign Application Priority Data

Jan. 31, 1984 [JP] Japan ................................. 59-14519

[51] Int. Cl.⁵ ........................... G01D 15/16; B41J 2/04
[52] U.S. Cl. ................................. 346/140 R; 400/120; 346/1.1
[58] Field of Search ............. 346/140 PD, 140 R, 1.1; 400/126

[56] References Cited

U.S. PATENT DOCUMENTS 4,394,670 7/1983 Sugitana ..................... 346/140 PD
4,490,728 12/1984 Vaught et al. ............... 346/140 PD Primary Examiner—Mark J. Reinhart
Attorney, Agent, or Firm—Fitzpatrick, Cella, Harper & Scinto

[57] ABSTRACT

This specification discloses a liquid injection recording head in which a support member provided with an energy generating member for generating energy utilized to discharge liquid and form flying droplets is flexible.

41 Claims, 4 Drawing Sheets

LIQUID INJECTION RECORDING HEAD WITH FLEXIBLE SUPPORT

This application is a continuation of application Ser. No. 041,629 filed Apr. 22, 1987, now abandoned, which in turn is a continuation of application Ser. No. 694,063, filed Jan. 23, 1985, now abandoned.

BACKGROUND OF THE INVENTION

1. Field of the Invention

This invention relates to a liquid injection recording head for injecting liquid and forming flying droplets to thereby accomplish recording.

2. Description of the Prior Art

Ink jet recording methods (liquid injection recording methods) have recently attracted attention in that the noise produced during recording is negligibly small and that it is capable of accomplishing high-speed recording and moreover accomplishing recording without requiring the special processing such as fixation of images on so-called plain paper.

Among these methods, the liquid injection recording methods disclosed, for example, in Japanese Laid-open Patent Application No. 51837/1979 and German Laid-open Patent Application (DOLS) No. 284,3064 have a feature different from the feature of the other liquid injection recording methods in that heat energy is caused to act on liquid to thereby obtain a motive force for droplet discharge.

That is, according to the recording methods disclosed in the aforementioned publications, the liquid subjected to the action of heat energy causes a state change resulting in a sharp increase in volume and by the action force based on the state change, liquid is discharged from the orifices at the fore end of the recording head unit, whereby flying droplets are formed and adhere to a recording medium, thus accomplishing recording.

Particularly, the liquid injection recording method disclosed in DOLS No. 284,3064 is not only very effectively applicable to the so-called drop-on demand recording method, but also can easily embody a recording head having its recording head unit of the full line type provided with highly dense multiorifice and therefore has a feature that images of high resolution and high quality can be obtained at a high speed.

The recording head unit of the apparatus applied to the above-described recording method is provided with a liquid discharging portion having orifices provided to discharge liquid therefrom and liquid flow paths communicating with said orifices and having as a part of the construction thereof a heat-acting portion in which the heat energy for discharging droplets acts on the liquid, and an electro-thermal converting member as means for generating the heat energy.

The electro-thermal converting member is provided with a pair of electrodes provided on a support member, and a heat generation resistive layer connected to these electrodes and having an area for generating heat (a heat generating portion) between these electrodes.

A typical example of the structure of such a liquid injection recording head is shown in FIGS. 1A and 1B of the accompanying drawings. FIG. 1A is a fragmentary front view of the liquid injection recording head as seen from the orifice side, and FIG. 1B is a fragmentary cross-sectional view taken along the dot-and-dash line XY of FIG. 1A.

The recording head 101 is of a structure in which the surface of a base plate 102 having an electro-thermal converting member on the surface thereof is joined so as to be covered with a grooved plate 103 provided with a predetermined number of grooves having a predetermined width and depth at predetermined line density, whereby orifices 104 and a liquid discharging portion 105 are formed. In the case of the recording head shown in FIG. 1, there is provided a plurality of orifices 104, whereas the present invention is not restricted to such a recording head, but a recording head having a single orifice also falls within the category of the present invention.

The liquid discharging portion 105 has orifices 104 for discharging liquid at the terminal end thereof, and a heat-acting portion 106 which is a portion in which the heat energy generated by the electro-thermal converting member acts on the liquid to produce bubbles and causes a sharp state change caused by the expansion and contraction of the volume thereof.

The heat-acting portion 106 overlies the heat generating portion 107 of the electro-thermal converting member and the bottom surface thereof provides a heat-acting surface 108 as the surface of the heat generating portion 107 which contacts the liquid.

The heat generating portion 107 is comprised of a lower layer 109 provided on a support member 114, a heat generation resistive layer 110 provided on the lower layer 109, and an upper layer 111 provided on the heat generation resistive layer 110. Electrodes 112 and 113 for supplying an electric power to the heat generation resistive layer 110 to generate heat are provided on the surface of the heat generation resistive layer 110. The electrode 112 is an electrode common to the heat generating portions of the liquid discharging portions, and the electrode 113 is a selection electrode for selecting the heat generating portions of the liquid discharging portions and causing them to generate heat and is provided along the liquid flow paths of the liquid discharging portions.

The upper layer 111 in the heat generating portion 107 isolates the heat generation resistive layer 110 from the liquid filling the liquid flow path of the liquid discharging portion 105 to chemically and physically protect the heat generation resistive layer 110 from the liquid used and also prevents the electrodes 112 and 113 from being short-circuited through the liquid. The upper layer 111 also serves to prevent any electrical leak between the adjacent electrodes. Especially, the prevention of the electrical leak between the selection electrodes or the prevention of the electric erosion of the electrodes which may result from the electrodes below the liquid flow paths contacting the liquid for some reason or other and supplying an electric power to the liquid is important and, for this purpose, the upper layer 111 having such a protective function is provided on at least the electrode underlying the liquid flow path.

Further, the liquid flow path provided in each liquid discharging portion communicates, upstream thereof, with a common liquid chamber (not shown) for storing therein the liquid to be supplied to said liquid flow path, but usually, the electrode connected to the electro-thermal converting member provided in each liquid discharging portion is provided so as to pass below said common liquid chamber upstream of the heat-acting portion because of the convenience of the designing thereof. Accordingly, said upper layer is usually provided to prevent the electrode from contacting the liquid in this portion as well.

The base plate 102 is provided with the support member 114 formed of silicon, glass, ceramics or the like, the lower layer 109 formed of a metal oxide such as $SiO_2$, zirconium oxide, tantalum oxide or magnesium oxide on the support member 114, the heat generation resistive layer 110, the common electrode 112 and the selection electrode 113 on the opposite sides of the heat generation resistive layer, the portion of the heat generation resistive layer 110 which is not covered with the electrodes, and the upper layer 111 provided so as to cover the electrodes 112 and 113.

As described above, in the conventional base plate, various layers are formed on a rigid support member by a method such as sputtering or evaporation. This is not suitable for mass production and has required a number of steps of process and a long time for manufacture. Also, the materials are expensive and therefore the cost of the liquid injection recording head has unavoidably been high. Further, the manufactured base plate is rigid and this has limited the range of use of the liquid injection recording head.

SUMMARY OF THE INVENTION

The present invention has been made in view of the above-noted points and a primary object thereof is to provide a liquid injection recording head which can achieve simplification of the production process and reduction in cost.

Another object of the present invention is to provide a liquid injection recording head whose range of use is wide.

Still another object of the present invention is to provide a liquid injection recording head having a support member provided with an energy generating member for discharging liquid and forming flying droplets and wherein at least said support member is flexible.

Yet still another object of the present invention is to provide a liquid injection recording head having a base plate provided with an electro-thermal converting member having a support member, a heat generation resistive layer provided on said support member and at least one pair of opposed electrodes electrically connected to said heat generation resistive layer, and a liquid flow path constituting member provided on said base plate correspondingly to said electro-thermal converting member and forming liquid flow paths communicating with orifices and wherein said support member and at least a portion of said liquid flow path constituting member are flexible.

DESCRIPTION OF THE PREFERRED EMBODIMENTS

The liquid injection recording head of the present invention will hereinafter be described by reference to the drawings.

Figure 1A:
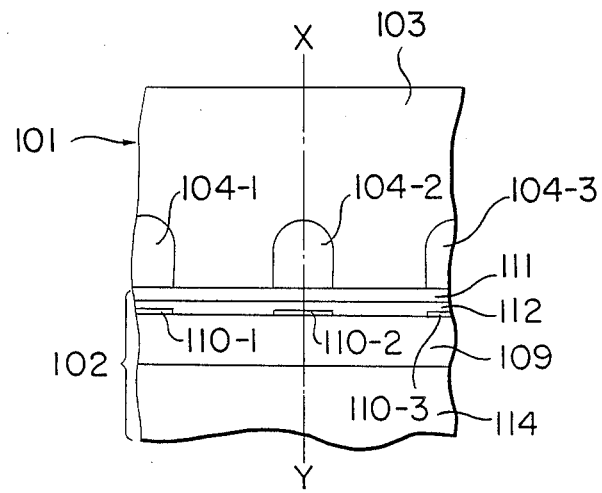
FIGS. 1A and 1B illustrate the construction of the liquid injection recording head according to the prior art, FIG. 1A being a schematic fragmentary front view, and FIG. 1B being a fragmentary cross-sectional view taken along the dot-and-dash line XY of FIG. 1A.
Figure 1B:
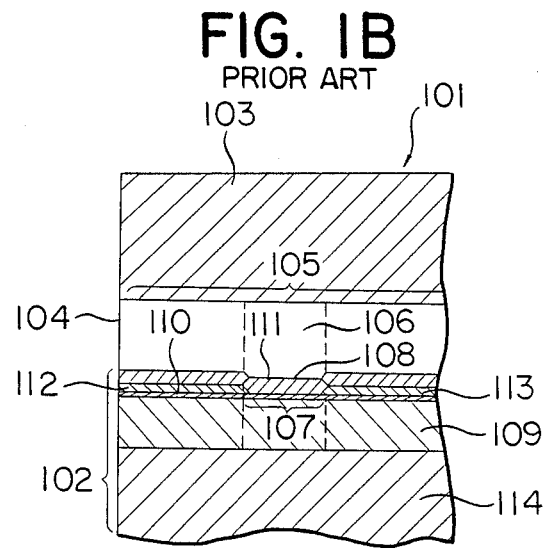
Figure 2A:
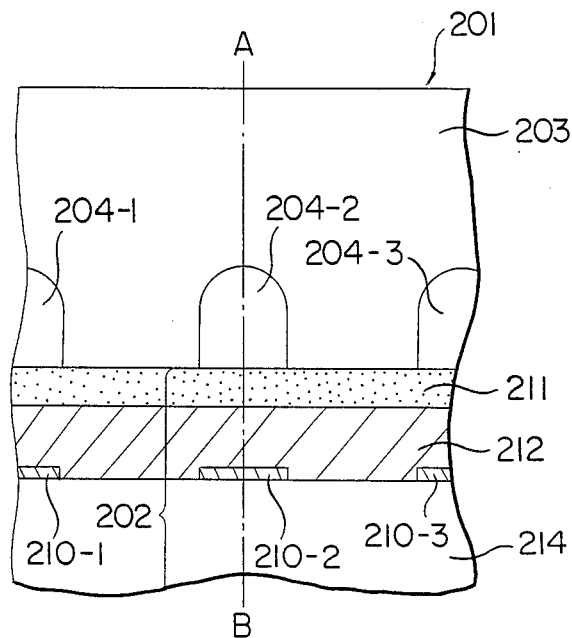
FIGS. 2A, 2B, 3A, 3B and 3C illustrate the construction of the injection recording head of the present invention, FIG. 2A being a schematic fragmentary front view, FIG. 2B being a fragmentary cross-sectional view taken along the dot-and-dash line AB of FIG. 2A, FIG. 3A being a schematic fragmentary cross-sectional view taken along a plane parallel to the orifice surface, FIG. 3B being a fragmentary cross-sectional view taken along the dot-and-dash line CD of FIG. 3A, and FIG. 3C being a plan view of a base plate.
Figure 2B:
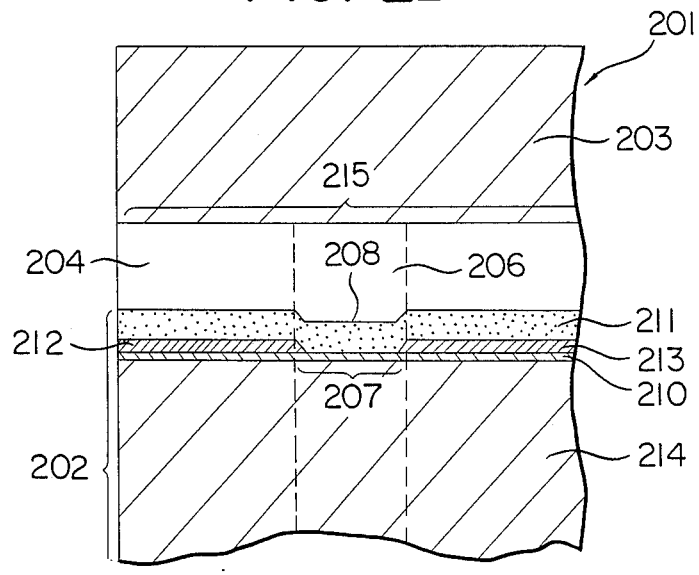

FIGS. 2A and 2B show the liquid injection recording head of the present invention. FIG. 2A is a front view of the orifice side and FIG. 2B is a fragmentary cross-sectional view taken along the dot-and-dash line AB of FIG. 2A.

The liquid injection recording head 201 has its main portion constituted by a base plate 202 for the liquid injection recording head utilizing heat energy which is provided with a desired number of electro-thermal converting members, and a grooved plate 203 having a desired number of grooves corresponding to said electro-thermal converting members.

The base plate 202 and the grooved plate 203 are joined together at a predetermined location as by an adhesive agent and form a liquid flow path 215 by the portion of the base plate 202 in which the electro-thermal converting members are provided and the grooves of the grooved plate 203. The liquid flow path 215 has a heat-acting portion 206 in a portion of the construction thereof.

The base plate 202 is provided with a heat generating resistive layer 210 on a flexible support member 214 formed of an organic resin, a common electrode 212 and a selection electrode 213 on the opposite sides of the upper surface of the heat generation resistive layer 210 and along the liquid flow path 215, and an upper layer 211 provided so as to cover the portion of the heat generation resistive layer 210 which is not covered by the electrodes and the portions of the electrodes 212 and 213.

The material forming the heat generation resistive layer 210 may be almost any material which generates heat as desired by being supplied with an electric power.

As such materials, mention may preferably be made, for example, of tantalum nitride, nichrome, gold-palladium alloy, silicon semiconductor, or metals such as hafnium, lanthanum, zirconium, titanium, tantalum, tungsten, molybdenum, niobium, chromium and vanadium and alloys thereof and borides thereof.

Among these materials available to form the heat generation resistive layer 210, especially metal borides can be mentioned as excellent materials, and what is most excellent in characteristic among them is hafnium boride, and next come zirconium boride, lanthanum boride, tantalum boride, vanadium boride and niobium boride in the named order.

As the materials forming the electrodes 212 and 213, many of electrode materials usually used can be effectively used and more specifically, metals such as Al, Ag, Au, Pt and Cu may be mentioned. The upper layer 211 differs in its required characteristics depending on the location at which it is provided. That is, for example, in the heat generating portion 207, it is required that the upper layer be excellent in (1) heat resisting property, (2) liquid resisting property, (3) liquid permeation preventing property, (4) heat conductivity, (5) oxidation preventing property, (6) insulativeness and (7) damage resisting property, and in the other area than the heat generating portion 207, it is required that the upper layer be sufficiently excellent in liquid permeation preventing property, liquid resisting property and damage resisting property although alleviated by thermal conditions.

It is further required of the upper layer that the covering property at the stepped portion be good and that the probability at which defects such as pin-holes are created in the formed layer be low and if such defects are created, they be at least negligibly small.

Therefore, to meet these requirements, the upper layer is formed by laminating a first protective layer formed of an inorganic insulating material and a second protective layer formed of an organic material, or by making the first protective layer into a two-layer structure and forming the lower layer of an inorganic insulating material and forming the upper layer of an inorganic material such as a metal having toughness and excellent in mechanical strength and having adhering property and tackiness relative to the first protective layer and the second protective layer, or by forming a third protective layer of an inorganic material such as a metal on the second protective layer.

Inorganic insulating materials relatively excellent in heat conductivity and heat resisting property are suitable as the material forming the lower layer of the first protective layer. As such materials, mention may be made, for example, of inorganic oxides such as $SiO_2$ and the like, transition metal oxides such as titanium oxide, vanadium oxide, niobium oxide, molybdenum oxide, tantalum oxide, tungsten oxide, chromium oxide, zirconium oxide, hafnium oxide, lanthanum oxide, yttrium oxide and manganese oxide, metal oxides such as aluminum oxide, calcium oxide, strontium oxide, barium oxide and silicon oxide, and complexes thereof, high resistance nitrides such as silicon nitride, aluminum nitride, boron nitride and tantalum nitride, and complexes of these oxides and nitrides, and thin film materials such as semiconductors including amorphous silicon and amorphous selenium which are of low resistance in bulk but can be made to have a high resistance in the process of manufacture such as the sputtering method, the CVD method, the evaporation method, the vapor reaction method or the liquid coating method.

As the materials which can form the upper layer of the first protective layer and the third protective layer, mention may be made of not only said Ta but also the elements of the group IIIa of the periodic table such as Sc and Y, the elements of the group IVa such as Ti, Zr and Hf, the elements of the group Va such as V and Nb, the elements of the group VIa such as Cr, Mo and W, the elements of the group VIII such as Fe, Co and Ni, alloys of said metals such as Ti-Ni, Ta-W, Ta-Mo-Ni, Ni-Cr, Fe-Co, Ti-W, Fe-Ti, Fe-Ni, Fe-Cr and Fe-Ni-Cr, borides of said metals such as Ti-B, Ta-B, Hf-B and W-B, carbides of said metals such as Ti-C, Zr-C, V-C, Ta-C, Mo-C and Cr-C, silicides of said metals such as Mo-Si, W-Si and Ta-Si, and nitrides of said metals such as Ti-N, Nb-N and Ta-N.

The upper layer of the first protective layer and the third protective layer each may be said single layer, but of course may also be a combination of these layers.

The second protective layer may be formed of an organic insulating material excellent in liquid permeation preventing property and liquid resisting action and further, it is desirable for this material to have the physical properties that (1) the material has a good film forming property, (2) the layer is of a delicate structure and has few pin-holes, (3) the material is not swollen or melted relative to the ink used, (4) the material has good insulativeness when formed into a film and (5) the material has a high heat resisting property. As such organic materials, mention may be made of the following resins: silicone resins, fluoroplastics, aromatic-polyamide, addition polymerization type polyimid, polybenzimidazile, metal chelated polymer, titanate ester, epoxy resins, phthalic acid resins, thermosetting phenolic resins, p-vinyl phenolic resin, zirox resins, triazine resins, B.T. resins, (polymer of triazin resins, and bismaleimide) or the like. In addition to these, the second protective layer can also be formed by evaporating polyxylene resin and its derivative.

Further, the second protective layer can be formed by the use of various organic compound monomer, for example, thiourea, vinylene ferrocene, 1,3,5-tri-chlorobenzene, chlorobenzen, styrene, ferrocene, pyrone, naphthalene, penta-methylbenzene, nitrotoluene, acrylonitrile, diphenylselenid, p-toluidine, p-xylene, N,N-dimethyl-P-toluidine, toluene, aniline, diphenyl mercury, hexa-methylbenzyen, malononitrile, tetracyanoethylene, thiophine, benzyen selenole, tetrafluoroethylene, ethylene, N-nitroso-diphenylamine, acetylene, 1,2,4-trichlorobenzene, propane, or the like, and by forming a film by plasma polymerization method.

However, if a high density multiorifice type recording head is to be made, it will be desirable that separately from said organic material, an organic material which very readily permits minute photolithography working be used as the material forming the second protective layer. As such organic material, mention may preferably be made, for example, of polyimide-isoindolo qinazoline-dione (trademark "PIQ" producted by Hitachi Kasei), polyimid-resine (trademark "PYRALIN" producted by Du-pont), cyclized-polybutadiene (trademark "JSR-CBR, or CBR-M901" producted by Nippon Gosei Rubber), Photoneece (trademark, producted by Toyo Rayon Co., Ltd) or photosensitive polyimide resin.

For the formation of each said layer, the film coating method can be used besides the conventional technique, thus simplifying the process.

In order that liquid may not leak from the outer surface around an orifice 204 and may not go around the outside of the orifice 204, it is preferable to apply a water repellent treatment in a case where the liquid is of the water system, and to apply an oil repellent treatment in a case where the liquid is of the non-water system.

The formation of the orifice 204 may be accomplished by attaching photosensitive resin to the base plate 202, forming a pattern by photolithography and further attaching a top plate thereto. Also, by using photosensitive resin, flow path walls for forming the liquid flow path may be formed simultaneously with the formation of the orifice 204.

The material of the grooved plate 203, like the material of the support member, may be a flexible film, as previously described. Almost any other materials than a flexible film would be effective if they are materials whose shapes are not or are hardly affected by heat under the environment during the working or use of the recording head and to which minute precision working is easily applicable and which can easily provide the surface accuracy as desired and which can be worked so that liquid can smoothly flow through the flow path formed by them.

As a typical example of such material, mention may be made of ceramics, glass, metal, plastic or silicon wafer.

Figure 3A:
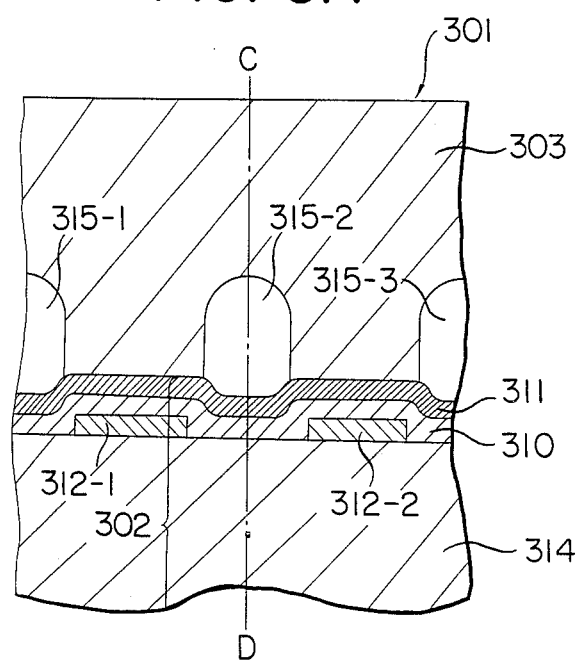
Figure 3B:
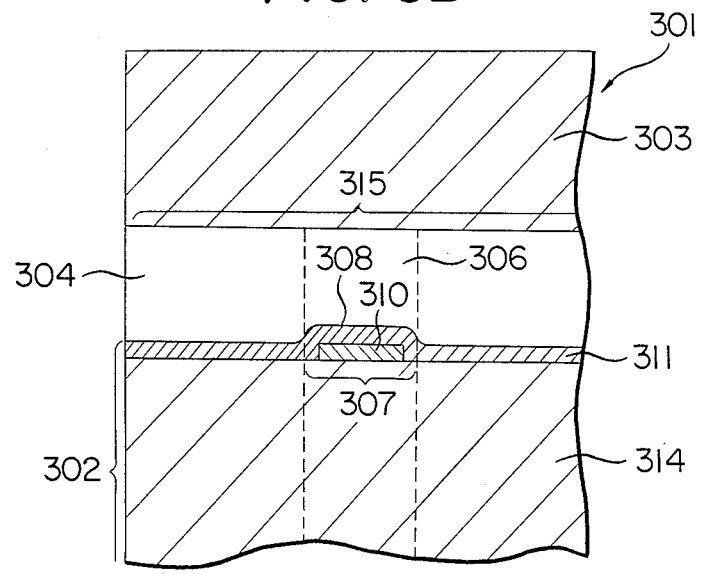
Figure 3C:
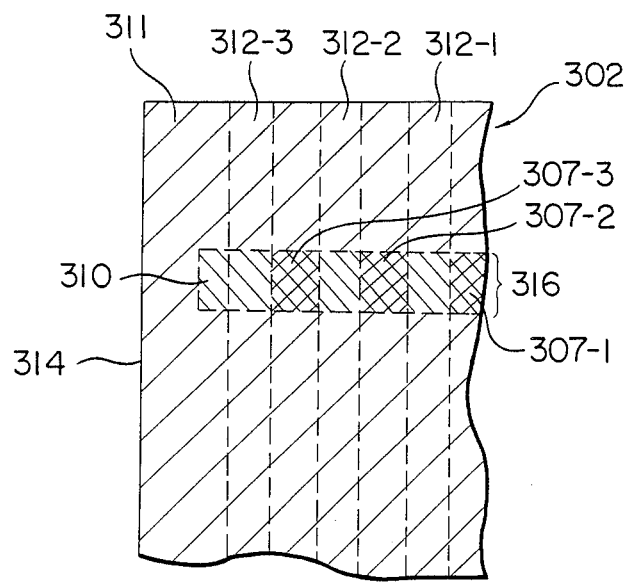

FIGS. 3A, 3B and 3C show another embodiment of the present invention. FIG. 3A is a fragmentary cross-sectional view taken along a plane parallel to the orifice surface in the heat generating portion, FIG. 3B is a fragmentary cross-sectional view taken along the dot-and-dash line CD of FIG. 3A, and FIG. 3C is a plan view of a base plate. In FIG. 3, reference numeral 301 designates a liquid injection recording head, reference numeral 302 denotes a base plate, reference numeral 303 designates a grooved plate, reference numeral 304 denotes an orifice, reference numeral 306 designates a heat-acting portion, reference numeral 307 denotes a heat generating portion, reference numeral 308 designates a heat-acting surface, reference numeral 310 denotes a heat generation resistive layer, reference numeral 311 designates an upper layer, reference numeral 312 denotes electrodes, reference numeral 314 designates a support member, reference numeral 315 denotes liquid flow paths, and reference numeral 316 designates the exposed portion of the electrodes.

The liquid injection recording head 301 shown may be manufactured by the following method.

First, flexible films are used as the materials of the support member 314 and the upper layer 311, and the support member 314, the upper layer 311 and the electrodes 312 are made by the conventional flexible print base plate process. A bar-like hole is formed in the portion 316 of the film indicated in FIG. 3C to expose the electrodes. The heat generation resistive layer 310 is made on the exposed portion of the electrodes by the use of a method such as evaporation or screen printing. The base plate made in the above-described manner and the grooved plate 303 provided with a predetermined number of grooves having a predetermined width and depth at predetermined line density are joined together. The grooved plate, as in the liquid injection recording head shown in FIG. 2, may be formed of a flexible film or a conventional material.

By using a flexible material for at least the support member 314 as described above, the construction and process can be simplified more than in the prior art and moreover, any special step of process becomes unnecessary. Further, the cost of the materials is lower than in the prior art and therefore, the cost of the liquid injection recording head can be reduced to 1/10 or less of the cost of the conventional liquid injection recording head. The liquid injection recording head itself becomes flexible (especially where both of the support member and the grooved plate are made of a flexible material) and therefore can be mounted in any form.

The liquid injection recording head of the present invention has the advantages as described above and therefore, the industrial utility thereof can be further enhanced.

In the liquid injection recording head of the present invention, what is formed of a flexible material may be only the support member or all the members which constitute the recording head. This is suitably determined by the mounting or the like of the recording head in manufacture. For example, if both of the support member and the grooved plate combined with the support member to form the liquid flow path are formed of a flexible material, the liquid injection recording head itself can be made flexible and the mounting thereof at a location whereat the mounting has heretofore been difficult becomes possible. By using a flexible material for the support member, the lower layer can be eliminated and the heat generation resistive layer, electrodes and upper layer can be formed not only by the conventional method but also by a method such as film coating or screen printing and thus, the process can be simplified.

The flexible material usable in the present invention may preferably be an organic resin film such as polyimide, fluororesin or acrylic resin.

In the above-described embodiments, the grooved plate has been shown as being joined onto the base plate to form the liquid flow path, whereas the grooved plate need not always be a single member but may be formed, for example, by a plurality of members such as the flow path walls and top plate. Where the grooved plate is comprised of a plurality of members, the flexible material may of course be used for at least one or all of the plurality of members.

In the case of a liquid injection recording head having a plurality of electro-thermal converting members, the liquid flow paths with which are communicated orifices provided correspondingly to the electro-thermal converting members need not always be independent for each orifice, but the plurality of orifices may be communicated with a common liquid flow path if the orifices do not substantially affect one another in respect of the discharge of liquid.

What is claimed is:

1. A liquid jet recording head having a discharge port for discharging liquid, the recording head comprising:
    a flexible support member, formed of an organic resin, including an energy generating member for generating energy utilized to discharge liquid through the discharge port, said energy generating member having a heat generating resistive layer and a pair of electrodes connected to said heat generating resistive layer; and
    a member bonded to said support member to form a liquid path communicating with the discharge port.

2. A liquid jet recording head according to claim 1, wherein said energy generating member further has an upper layer.

3. A liquid injection recording head according to claim 2, wherein said upper layer is formed of an inorganic insulating material.

4. A liquid jet recording head according to claim 2, wherein said upper layer has at least a layer formed of an inorganic insulating material and a layer formed of an organic material which are provided on at least a portion of said electrodes, and a layer formed of an inorganic insulating material and a layer formed of an inorganic material which are provided on at least a portion of said heat generating resistive layer between said electrodes.

5. A liquid jet recording head according to claim 1, wherein said organic resin is a material selected from among polyimide, fluororesin and acrylic resin.

6. A liquid jet recording head having a discharge port for discharging liquid, the recording head comprising:
    a flexible support member, formed of an organic resin, including an energy generating member for generating energy utilized to discharge liquid through the discharge port, said energy generating member having a heat generating resistive layer and a pair of electrodes connected to said heat generating resistive layer, and
    a flexible liquid path constituting member, formed of an organic resin, bonded to said base plate and having a channel section forming a liquid path communicating with the discharge port.

7. A liquid jet recording head according to claim 1, wherein said member bonded to said support member includes a channel section forming the liquid path.

8. A liquid jet recording head according to claim 1, wherein said member bonded to said support member includes a liquid path wall-forming member and a lid plate forming the liquid path.

9. A liquid injection recording head according to claim 1, wherein the liquid is ink.

10. A liquid injection recording head according to claim 2, wherein said upper layer includes a layer of an organic resin material and is flexible.

11. A liquid jet recording head according to claim 6, wherein said organic resin is a material selected from among polyimide, fluororesin and acrylic resin.

12. A liquid jet recording head according to claim 6, wherein said energy generating member further has an upper layer.

13. A liquid jet recording head according to claim 12, wherein said upper layer is formed of an inorganic insulating material.

14. A liquid jet recording head according to claim 12, wherein said upper layer has at least a layer formed of an inorganic insulating material and a layer formed of an organic material which are provided on at least a portion of said electrodes, and layers formed of an inorganic insulating material and an inorganic material which are provided on at least a portion of said heat generating resistive layer between said electrodes.

15. A liquid jet recording head according to claim 12, wherein said upper layer includes a layer of an organic resin material and is flexible.

16. A liquid jet recording head according to claim 6, wherein the liquid is ink.

17. A base plate for use in a liquid jet recording head, the base plate comprising:
a flexible support member formed of an organic resin; and
an energy generating member on said support member and including a heat generating resistive layer and a pair of electrodes connected to said heat generating resistive layer, wherein said heat generating resistive layer and said electrodes comprise a film thinner than said support member such that the base plate as a whole is flexible.

18. A base plate for use in a liquid jet recording head according to claim 17, wherein said energy generating member further has an upper layer.

19. A base plate for use in a liquid jet recording head according to claim 18, wherein said upper layer is formed of an inorganic insulating material.

20. A base plate for use in a liquid jet recording head according to claim 18, wherein said upper layer has at least a layer formed of an inorganic insulating material and a layer formed of an organic material which are provided on at least a portion of said electrodes, and a layer formed of an inorganic material and provided on at least a portion of said heat generating resistive layer between said electrodes.

21. A base plate for use in a liquid jet recording head according to claim 17, wherein said organic resin is a material selected from among polyimide, fluororesin and acrylic resin.

22. A base plate according to claim 18, wherein said upper layer comprises a flexible film thinner than said support member.

23. A base plate according to claim 18, wherein said upper layer includes a layer of a flexible organic resin material.

24. A base plate according to claim 18, wherein said heat generating resistive layer is disposed on said electrodes.

25. A base plate according to claim 17, wherein the liquid is ink.

26. A liquid jet recording head having a discharge port for discharging liquid, the recording head comprising:
a flexible support member, formed of an organic resin, including an energy generating member for generating energy utilized for discharging liquid through the discharge port, said energy generating member having a heat generating resistive layer on top of a pair of electrodes connected to said heat generating resistive layer; and
a member bonded to said support member to form a liquid path communicating with the discharge port.

27. A liquid jet recording head according to claim 26, wherein said energy generating member further has an upper layer.

28. A liquid jet recording head according to claim 27, wherein said upper layer is formed of an inorganic insulating material.

29. A liquid jet recording head according to claim 22, wherein said upper layer has at least a layer formed of an inorganic insulating material and a layer formed of an organic material which are provided on at least a portion of said electrodes, and a layer formed of an organic material which are provided on at least a portion of said heat generating resistive layer between said electrodes.

30. A liquid jet recording head according to claim 26, wherein said organic resin is a material selected from among polyimide, fluororesin and acrylic resin.

31. A liquid jet recording head according to claim 26, wherein said upper layer includes a layer of an organic resin material and is flexible.

32. A liquid jet recording head according to claim 26, wherein said member bonded to said support member has a channel section forming the liquid path.

33. A liquid jet recording head according to claim 26, wherein said member bonded to said support member includes a liquid path wall forming member and a lid plate forming the liquid path.

34. A liquid jet recording head according to claim 26, wherein the liquid is ink.

35. A liquid jet recording head having a discharge port for discharging liquid, the recording head comprising:
a flexible support member, formed of an organic resin, including an energy generating member for generating discharge energy utilized to discharge liquid through the discharge port, said energy generating member having a heat generating resistive layer and a pair of electrodes connected to said heat generating resistive layer; and
a member, formed of an organic resin, bonded to said support member and including a liquid path wall forming member and a lid plate to form a liquid path communicating with the discharge port.

36. A liquid jet recording head according to claim 35, wherein said energy generating member further has an upper layer.

37. A liquid jet recording head according to claim 36, wherein said upper layer is formed of an inorganic insulating material.

38. A liquid jet recording head according to claim 36, wherein said upper layer has at least a layer formed of an inorganic insulating material and a layer formed of an organic material which are provided on at least a portion of said electrodes, and a layer formed of an inorganic insulating material and a layer formed of organic material and provided on at least a portion of said heat generating resistive layer between said electrodes.

39. A liquid jet recording head according to claim 36, wherein said upper layer includes a layer of an organic resin material and is flexible.

40. A liquid jet recording head according to claim 35, wherein said organic resin is a material selected from among polyimide, fluororesin and acrylic resin.

41. A liquid jet recording head according to claim 35, wherein the liquid is ink.

* * * * *

UNITED STATES PATENT AND TRADEMARK OFFICE
CERTIFICATE OF CORRECTION

PATENT NO. : 4,956,654

DATED : September 11, 1990

INVENTOR(S) : HIROKAZU KOMURO ET AL.

It is certified that error appears in the above-identified patent and that said Letters Patent is hereby corrected as shown below:

Title Page:
AT [56] REFERENCES CITED SHOULD READ:

--U.S. PATENT DOCUMENTS

| | | | |
|---|---|---|---|
| 2,512,743 | 6/1950 | Hansell | 346/140 PD |
| 4,189,734 | 2/1980 | Kyser et al. | 346/1.1 |
| 4,296,421 | 10/1981 | Hara et al. | 346/140 PD |
| 4,394,670 | 7/1983 | Sugitani et al. | 346/140 PD |
| 4,480,259 | 10/1984 | Kruger et al. | 346/140 PD |
| 4,490,728 | 12/1984 | Vaught et al. | 346/140 PD |
| 4,528,574 | 7/1985 | Boyden | 340/140 PD |

FOREIGN PATENT DOCUMENTS 57-20904    5/1982    Japan--.

COLUMN 1

Line 26, "No. 284,3064" should read --No. 2843064--.

Line 40, "No. 284,3064" should read --No. 2843064--.

COLUMN 8

Line 41, "injection" should read --jet--.

Line 66, "said base plate" should read --said flexible support member--.

UNITED STATES PATENT AND TRADEMARK OFFICE
CERTIFICATE OF CORRECTION

PATENT NO. : 4,956,654

DATED : September 11, 1990

INVENTOR(S) : HIROKAZU KOMURO ET AL.

It is certified that error appears in the above-identified patent and that said Letters Patent is hereby corrected as shown below:

COLUMN 9

Line 8, "injection" should read --jet--.

Line 10, "injection" should read --jet--.

COLUMN 10

Line 28, "claim 22," should read --claim 27,--.

Signed and Sealed this

Twentieth Day of October, 1992

Attest:

DOUGLAS B. COMER

Attesting Officer — Acting Commissioner of Patents and Trademarks